United States Patent
Stebnicki et al.

(10) Patent No.: US 7,854,315 B2
(45) Date of Patent: Dec. 21, 2010

(54) CONVEYOR PLATE WITH INTEGRATED ROLLER

(75) Inventors: James C. Stebnicki, Glendale, WI (US); Robert E. Mitchell, Milwaukee, WI (US)

(73) Assignee: Roxnord Industries, LLC, Milwaukee, WI (US)

( * ) Notice: Subject to any disclaimer, the term of this patent is extended or adjusted under 35 U.S.C. 154(b) by 0 days.

(21) Appl. No.: 12/478,489

(22) Filed: Jun. 4, 2009

(65) Prior Publication Data

US 2009/0236203 A1    Sep. 24, 2009

Related U.S. Application Data

(62) Division of application No. 11/290,104, filed on Nov. 30, 2005, now Pat. No. 7,556,142.

(51) Int. Cl.
B65G 13/10 (2006.01)
B65G 17/08 (2006.01)
B65G 17/06 (2006.01)

(52) U.S. Cl. .................. 198/850; 198/779; 198/851; 198/852; 198/853

(58) Field of Classification Search ............... 198/778, 198/777, 779, 851, 852, 853
See application file for complete search history.

(56) References Cited

U.S. PATENT DOCUMENTS

| | | |
|---|---|---|
| 2,298,386 A | 10/1942 | Jennings |
| 3,627,109 A | 12/1971 | Cabak |
| 3,651,924 A | 3/1972 | Homeier et al. |
| 3,674,130 A | 7/1972 | Carmichael |
| 3,706,371 A | 12/1972 | Hirota |
| 3,788,447 A | 1/1974 | Stephanoff |
| 3,826,352 A | 7/1974 | Van Zon et al. |
| 3,854,575 A | 12/1974 | Fraioli, Sr. |
| 3,857,476 A * | 12/1974 | Heifetz et al. ............... 198/778 |
| 3,944,059 A | 3/1976 | Garvey |
| 3,946,857 A | 3/1976 | Fraioli, Sr. |
| 3,951,256 A | 4/1976 | Gurewitz |

(Continued)

FOREIGN PATENT DOCUMENTS

DE    39 14994 A1    11/1990

(Continued)

OTHER PUBLICATIONS

U.S. Appl. No. 11/290,104, Notice of Allowance, Mar. 5, 2009.

(Continued)

*Primary Examiner*—Gene Crawford
*Assistant Examiner*—Kavel P Singh
(74) *Attorney, Agent, or Firm*—Quarles & Brady LLP

(57) ABSTRACT

A conveyor support plate includes an upper transport surface configured to receive objects arranged for travel on a conveyor system and a lower surface arranged opposite the upper transport surface. A pair of transversely extending walls and a pair of side walls connect the upper transport surface and the lower surface. A plurality of cavities are formed in the lower surface between the pair of transversely extending walls and the pair of side walls that terminate below the upper transport surface. The cavities are configured to receive a roller that extends through the lower surface to support the support plate during travel on the convey system.

13 Claims, 8 Drawing Sheets

U.S. PATENT DOCUMENTS

| | | | |
|---|---|---|---|
| 4,164,283 A | 8/1979 | Flajnik | |
| 4,410,081 A | 10/1983 | Weihe, Jr. | |
| 4,441,605 A | 4/1984 | Ronco et al. | |
| 4,458,806 A | 7/1984 | Weihe et al. | |
| 4,645,070 A | 2/1987 | Homeier | |
| 4,770,291 A | 9/1988 | Shaw | |
| 4,867,301 A | 9/1989 | Roinestad et al. | |
| 5,176,247 A | 1/1993 | Counter et al. | |
| 5,224,587 A | 7/1993 | Robertson | |
| 5,291,987 A | 3/1994 | Zink | |
| 5,573,105 A | 11/1996 | Palmaer | |
| 5,586,644 A | 12/1996 | Coen et al. | |
| 5,775,480 A | 7/1998 | Lapeyre et al. | |
| 6,336,551 B1 | 1/2002 | Balk | |
| 6,364,095 B1 | 4/2002 | Layne et al. | |
| 6,401,914 B1 | 6/2002 | Greve | |
| 6,568,522 B1 | 5/2003 | Boclaars | |
| 6,571,937 B1 * | 6/2003 | Costanzo et al. | 198/779 |
| 6,578,704 B1 | 6/2003 | MacLachlan | |
| 6,585,110 B2 | 7/2003 | Layne et al. | |
| 6,796,418 B1 * | 9/2004 | Harrison et al. | 198/778 |
| 2001/0045346 A1 * | 11/2001 | Costanzo | 198/853 |
| 2003/0075419 A1 | 4/2003 | Layne et al. | |
| 2005/0150748 A1 | 7/2005 | Zubair et al. | |

FOREIGN PATENT DOCUMENTS

| | | |
|---|---|---|
| GB | 1 463 226 | 2/1977 |
| WO | WO 03/024846 | 3/2003 |

OTHER PUBLICATIONS

U.S. Appl. No. 11/290,104, Appeal Brief, Nov. 17, 2008.
U.S. Appl. No. 11/290,104, Notice of Appeal, Sep. 15, 2008.
U.S. Appl. No. 11/290,104, Final Rejection, Jun. 17, 2008.
U.S. Appl. No. 11/290,104, Amendment, Feb. 27, 2008.
U.S. Appl. No. 11/290,104, Non-Final Rejection, Nov. 27, 2007.
U.S. Appl. No. 11/290,104, Amendment, Sep. 19, 2007.
U.S. Appl. No. 11/290,104, Non-Final Rejection, Jun. 20, 2007.
U.S. Appl. No. 11/290,104, Response to Election/Restriction, May 31, 2007.
U.S. Appl. No. 11/290,104, Requirement for Election/Restriction, Apr. 30, 2007.
EP 06 838 518.6-1261, Communication, Sep. 9, 2009.
PCT/US2006/045602, International Search Report, Mar. 19, 2007.
PCT/US2006/045602, Written Opinion, Mar. 19, 2007.
International Search Report dated Mar. 19, 1997.
The Complete Guide to Chain, 1997 by U.S. Tsubaki, Inc.

* cited by examiner

CONVEYOR PLATE WITH INTEGRATED ROLLER

CROSS REFERENCES TO RELATED APPLICATIONS

This application claims priority to and is a divisional application of U.S. application Ser. No. 11/290,104, filed Nov. 30, 2005, issued as U.S. Pat. No. 7,556,142 on Jul. 7, 2009, which is hereby incorporated by reference as if fully set forth herein.

STATEMENT REGARDING FEDERALLY SPONSORED RESEARCH

Not Applicable.

BACKGROUND OF THE INVENTION

The present invention is directed to a conveyer, and more particularly, to a support plate for a conveyor having integrated rollers to promote travel along a desired path by reducing torsional, load bearing, and resistive forces on the conveyor.

Conveyors are subjected to many forces when transporting products along a path. Helical conveyor systems, for example, are common in a wide variety of industries as they provide an efficient means through which to move products, parts, and the like over vertical distances. However, when traversing a spiraled path between vertical distances, these helical conveyer systems are subjected to a variety of forces. For example, during operation, these systems are subjected to torsional forces caused by following the spiraled path, vertical loading forces caused by following a vertically ascending or descending path, and horizontal loading forces caused by following the horizontal component of the path. These forces can be further compounded when carrying significant loads and especially when encountering a build-up of debris along the spiraled path. Over time, these forces can cause significant wear on the helical conveyor system and/or interfere with the operation of the conveyor system.

In an effort to reduce the stresses associated with these forces, various bearing designs have been utilized. For example, some helical conveyor systems employ a base chain arranged on the spiraled path that includes bearings mounted thereon to create an interface between the base chain and the spiraled path. In some cases, these bearings may be roller bearings mounted on the base chain to engage the spiraled path and reduce frictional forces between the base chain and the spiraled path. While these bearing systems mounted to the base chain can reduce some torsional, vertical, and horizontal forces, the base chain forms but a small portion of the overall helical conveyor system and, thus, significant forces are still applied to the overall helical conveyor system. Accordingly, significant power is required to overcome these forces and move the helical conveyor along the spiraled path and significant wear is incurred over time.

Therefore, it would be desirable to have a system to further reduce torsional, frictional, and loading forces on a conveyor system traveling along a path.

BRIEF SUMMARY OF THE INVENTION

The present invention overcomes the aforementioned drawbacks by providing a support plate for a helical conveyor system including a plurality of integrated roller bearings. In particular, a plurality of cavities is formed in each support plate in which rollers may be disposed that extend below the support plate and rotate against a guide path of a spiraled path over which the helical conveyor travels.

In accordance with one aspect of the invention, a conveyor support plate includes an upper surface configured to receive objects arranged for travel on a conveyor system and a lower surface arranged opposite the upper surface. The conveyor support plate also includes a leading wall and a trailing wall as well as a pair of side walls connecting the upper surface and the lower surface. A plurality of cavities are formed in the lower surface that terminate below the upper surface and are arranged between the leading and trailing walls and the pair of side walls. Additionally, the plurality of cavities is designed to receive a roller therein that extends through the lower surface to support the support plate during travel of the convey system.

In accordance with another aspect of the invention, a conveyor system includes a travel path having a horizontally oriented guide surface. A plurality of support plates are included that have at least two cavities extending below a top surface and through a bottom surface. At least one roller is supported in each of the cavities to rotatably engage the horizontally oriented guide surface. Accordingly, the rollers support the support plates above the horizontally oriented guide surface as conveyor system traverses the travel path.

In accordance with yet another aspect of the invention, a conveyor system is designed to travel along a spiral path. The conveyor system includes a base chain having pairs of sidebars pivotally connected by corresponding pins. A plurality of support plates is engaged with the base chain that have an upper transport surface and a lower surface extending along the spiral path. At least one cavity is formed in the plurality of support plates that extends through the lower surface but terminates prior to the transport surface. The conveyor system also includes at least one roller engaged within the each cavity to roll against a guide surface of the spiral path as the conveyor system progresses over the spiral path.

The foregoing and other features and advantages of the invention will be made apparent from the following description. In the description, reference is made to the accompanying drawings which form a part hereof, and in which there is shown by way of illustration an embodiment of the invention.

DETAILED DESCRIPTION OF THE INVENTION

Figure 1:
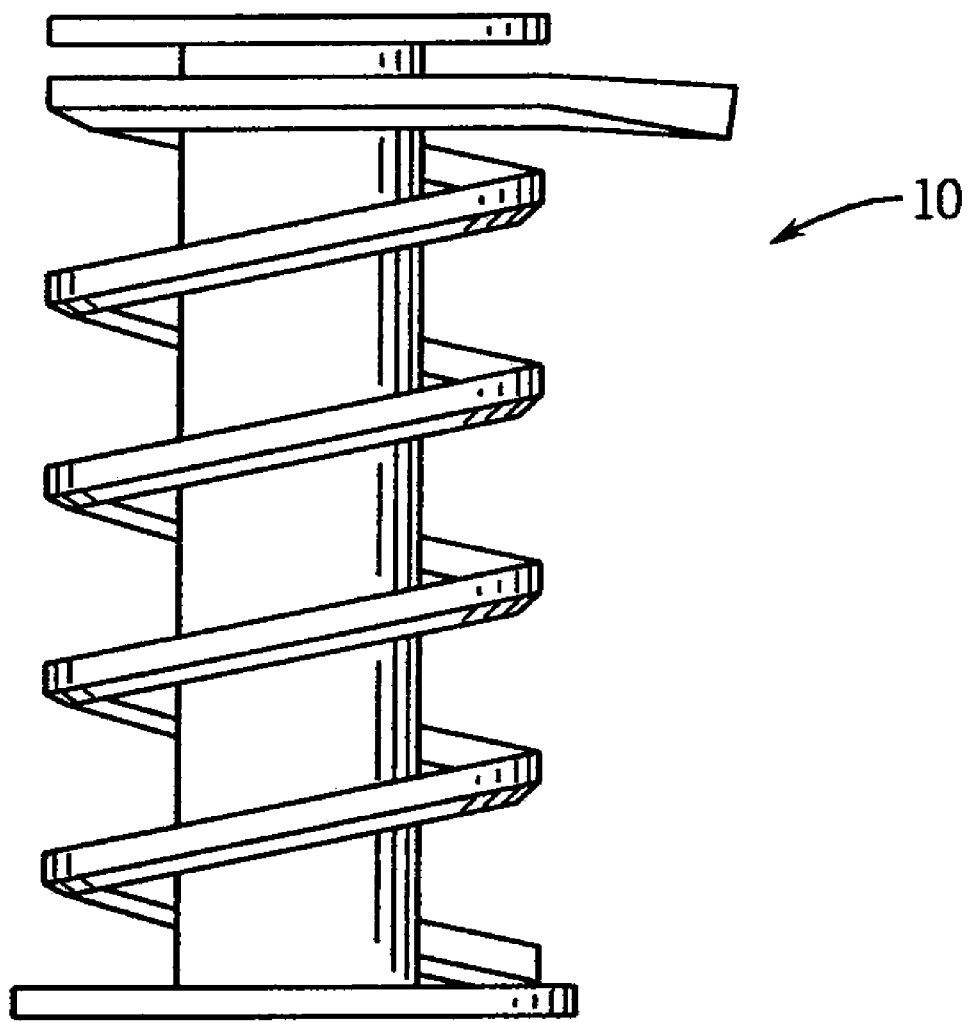
FIG. 1 is a side view of a spiral path forming guide surfaces for a helical conveyor system of the present invention.

Referring to FIG. 1, a spiral path 10 is shown that presents guide surfaces for a helical conveyor system of the present invention. That is, as will be described, the helical conveyor system of the present invention is configured to traverse the spiral path 10 in either an ascending or descending direction.

Figure 2:
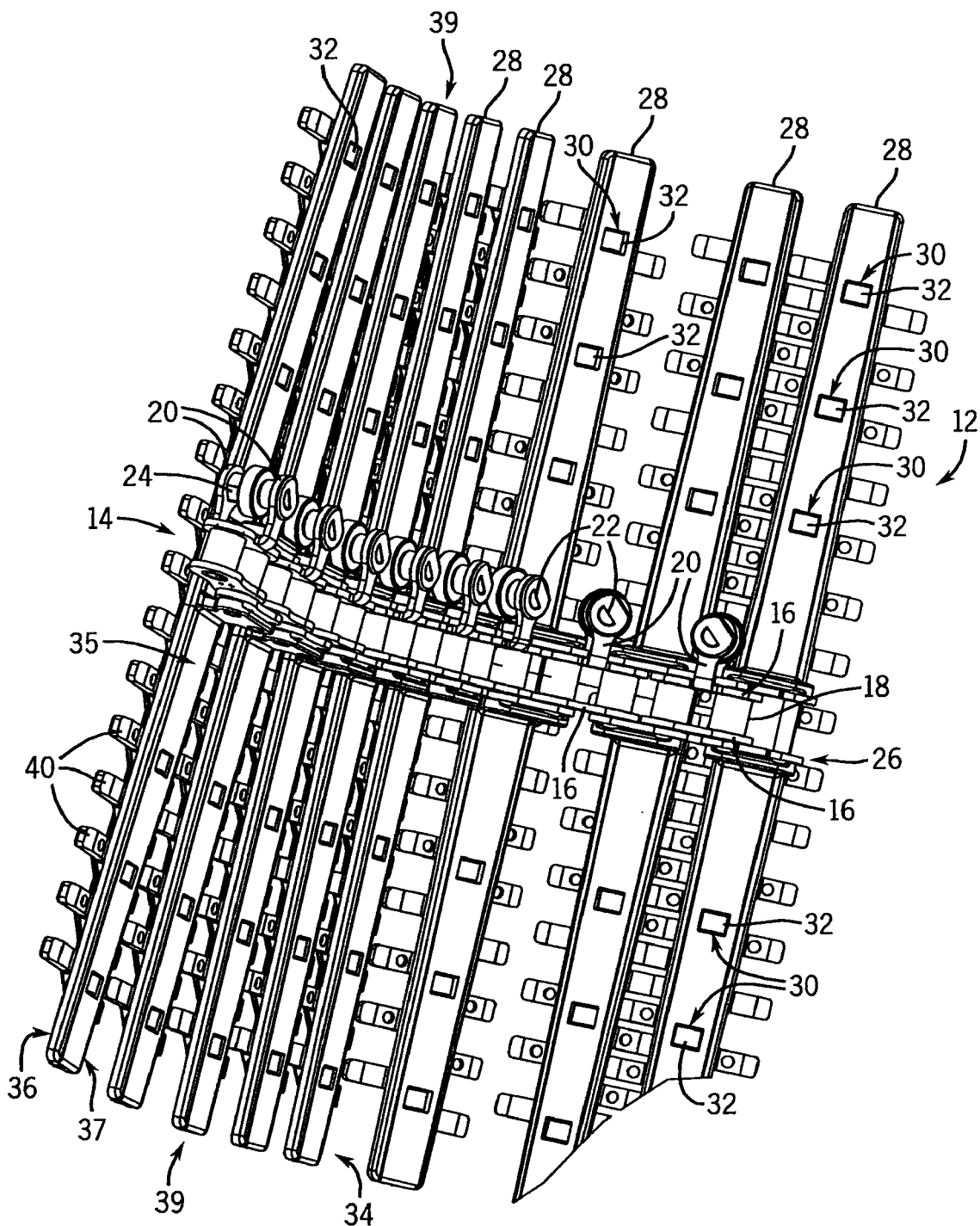
FIG. 2 is a bottom perspective view of a helical conveyor system in accordance with the present invention.

Referring now to FIG. 2, a helical conveyor system 12 includes a base chain 14, such as the roller chain shown, having paired sidebars 16 pivotally connected through a plurality of pins 18. Extending transversely from one of the pair of sidebars 16 is a pair of arms 20. Extending between the pair of arms 20 and fixed therein by a pin 22 is a bearing in the form of a roller 24. In this regard, the roller bearing 24 is configured to be supported by the pair of arms 20 and rotate about an axis extending along the pin 22.

Engaged with the base chain 14 through an interface 26 is a plurality of support plates 28. Each support plate 28 extends transversely in either direction away from the interface 26 and include a lower surface 34 and an upper transport surface 36 joined by a leading edge 35, a trailing edge 37, and a pair of side walls 39. A plurality of downwardly opening passages or cavities 30 are formed within the lower surface 34 of each support plate 28. Disposed within each of the cavities 30 is a support bearing in the form of a roller 32.

Figure 3:
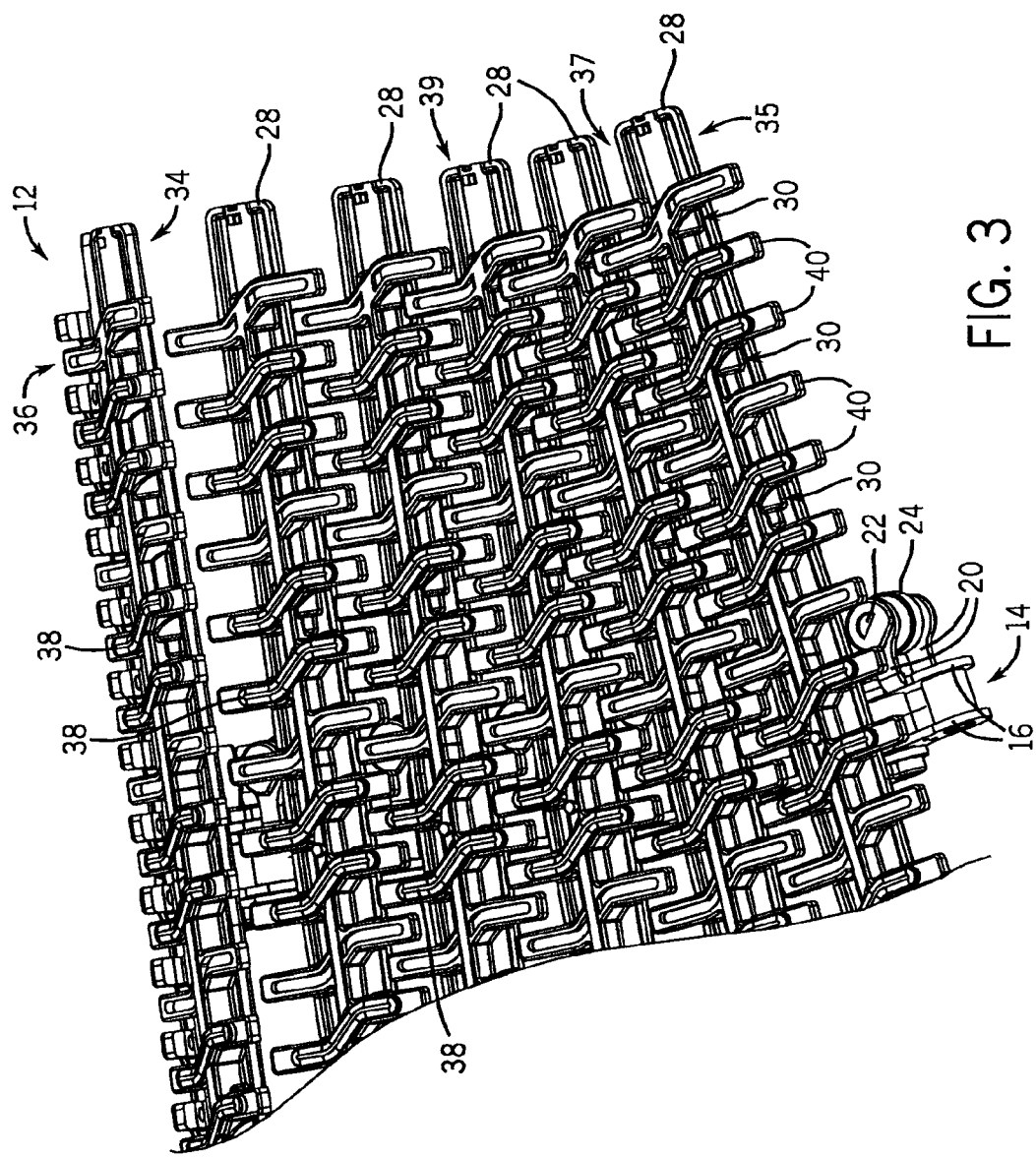
FIG. 3 is a top perspective view of the helical conveyor system of FIG. 2.

As shown in FIG. 2, the cavities 30 extend through the lower surface 34 of each support plate such that the rollers 32 extend below the lower surface 34 of each support plate 28. However, as shown in FIG. 3, the cavities 30 do not extend above an upper transport surface 36 of the support plates 28. Therefore, referring to FIGS. 2 and 3, the cavities 30 are formed in the plurality of support plates 28 such that they extend through the lower surface 34 of the support plates 28 but terminate prior to extending to the upper transport surface 36 of the support plates 28. As will be described, this configuration enables the helical conveyer system 12 to move with reduced friction when traversing a spiral path such as shown in FIG. 1, but will not interfere with objects being transported on the upper transport surface 36 of the plurality of support plates 28.

Additionally, as shown in FIG. 3, it is contemplated that the upper transport surface 36 may include a variety of features that advantageously facilitate both transport of objects disposed on the upper transport surface 36 and movement of the helical conveyor 12 along a spiral path. For example, substances that increase the coefficient friction of the upper transport surface 36, such as rubber 38, may be disposed in a variety of patterns to aid in fixing objects positioned on the upper transport surface 36 in a given position. Furthermore, a plurality of interlocking ribs 40 may be positioned on the upper transport surface 36 or, more specifically, form an upper surface of the upper transport surface 36 to provide a more uniform and substantial upper transport surface 36 while simultaneously allowing the flexing of adjacent support plates 28 necessary to traverse a spiral path, such as shown in FIG. 1. That is, the reciprocally contoured design of the ribs 40 as disposed on the support plates 28 forms a more substantial upper transport surface 36 as well as permits the support plates 28 to flex as the base chain 14 is curved around a spiral path.

Figure 4:
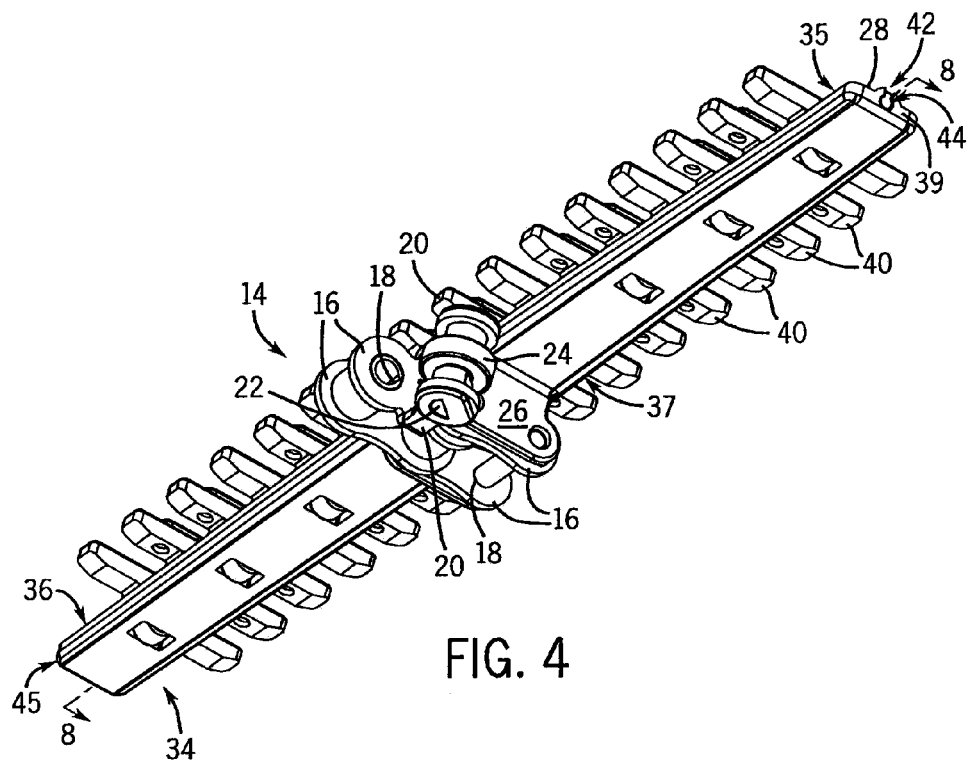
FIG. 4 is a bottom perspective view of a single support plate and linking of base chain of the helical conveyor system of FIGS. 2 and 3.

Referring now to FIG. 4, a single support plate 28 is shown engaged with a portion of the base chain 14. As shown, the interface 26 between the support plate 28 and base chain 14 is formed as a snap-on connection configured to engage the pins 18 joining the sidebars 16 of the base chain 14. In this regard, an individual support plate 28 may be quickly and easily removed from engagement with the base chain 14 for maintenance or replacement.

Additionally, in the embodiment shown in FIG. 4, the plurality of rollers 32 are retained within the respective cavities 30 by way of a pin or axle 42 extending through a transverse passage 44 formed within the support plate between the upper transport surface 36 and the lower surface 34. More particularly, the pin 42 is disposed in the transversely extending passage 44, which extends between the pair of side walls 39 joining the upper transport surface 36 and the lower surface 34. Therefore, the pin 42 extends parallel to the transversely extending leading edge 35 and trailing edge 37 that also join the upper transport surface 36 and the lower surface 34.

Figure 5:
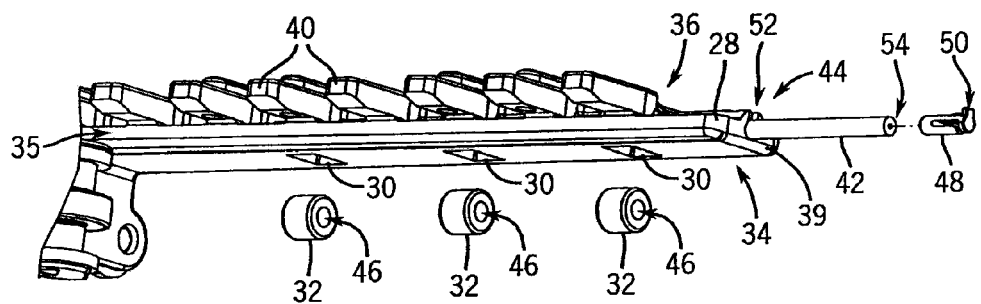
FIG. 5 is a partial bottom exploded perspective view of the single support plate of FIG. 4 showing a fastening system for the roller bearings.

In particular, referring to FIG. 5, as the pin 42 is passed through the transversely formed passage 44, it extends through each of the cavities 30 formed in the support plates 28. Accordingly, each of the rollers 32 includes an opening 46 formed therein that, when disposed within a cavity 30, aligns coaxially with the transversely extending passage 44 such that the pin 42 can be extended through the transversely extending passage 44 and pass through each of the openings 46 formed within the rollers 32. Therefore, the rollers 32 are rotatably secured within the cavities 30.

Furthermore, a locking mechanism 48 may be utilized that includes a plug or tab 50 configured to engage a recess 52 formed in the support plate 28. That is, once the pin 42 is extended through the transversely extending passages 44 and each respective opening 46 of the plurality of rollers 32, the locking mechanism 48 may be positioned within the end of the transversely extending passage 44 such that the tab 50 engages the recess 52 of the support plate 28 to lock the pin 42 within the transversely extending passage 44. Alternatively, it is contemplated that the locking mechanism 48 may be integrally formed on an end 54 of the pin 42.

Figure 6:
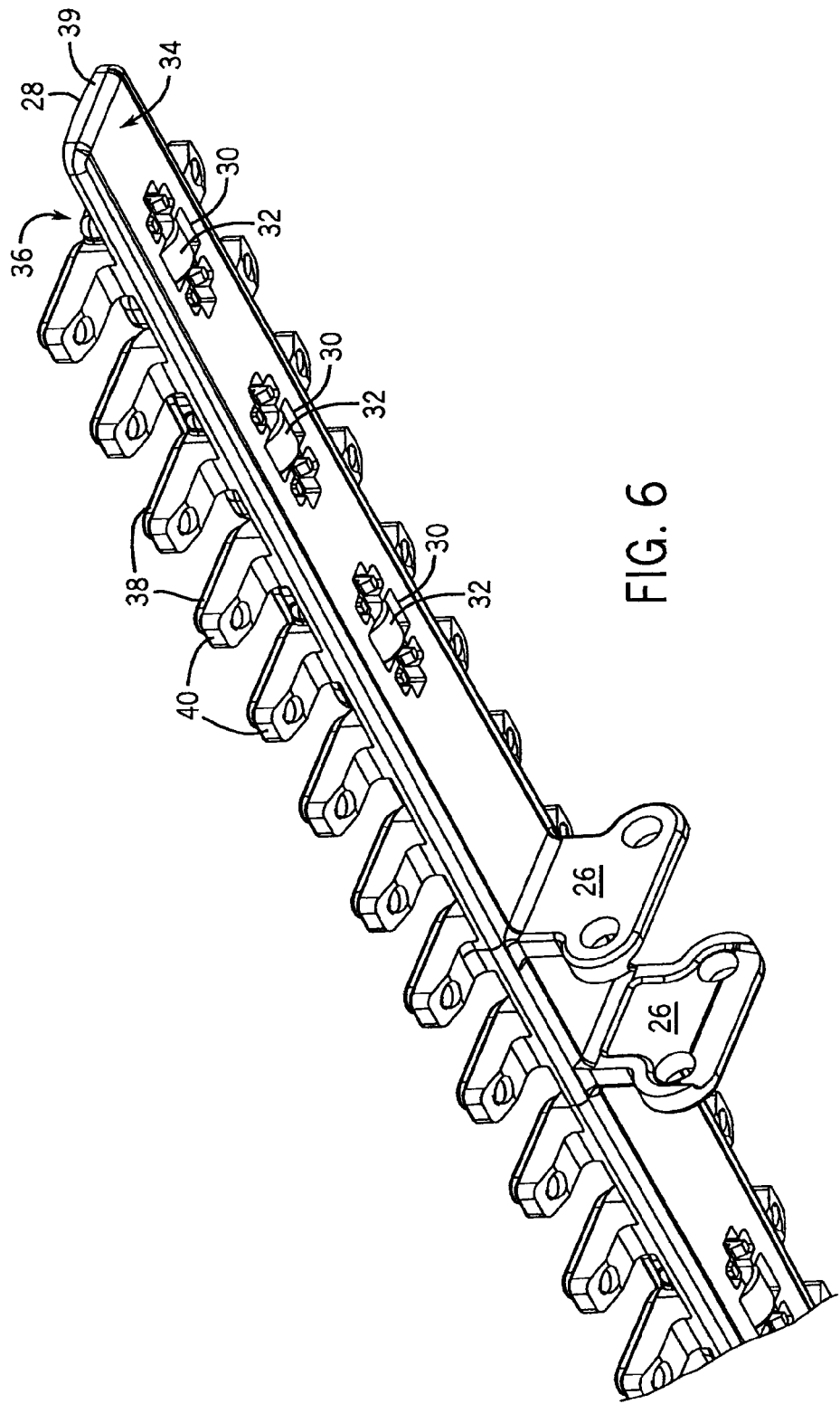
FIG. 6 is a partial bottom perspective view of a support plate showing an alternative fastening system for the roller bearings in accordance with the present invention.
Figure 7:
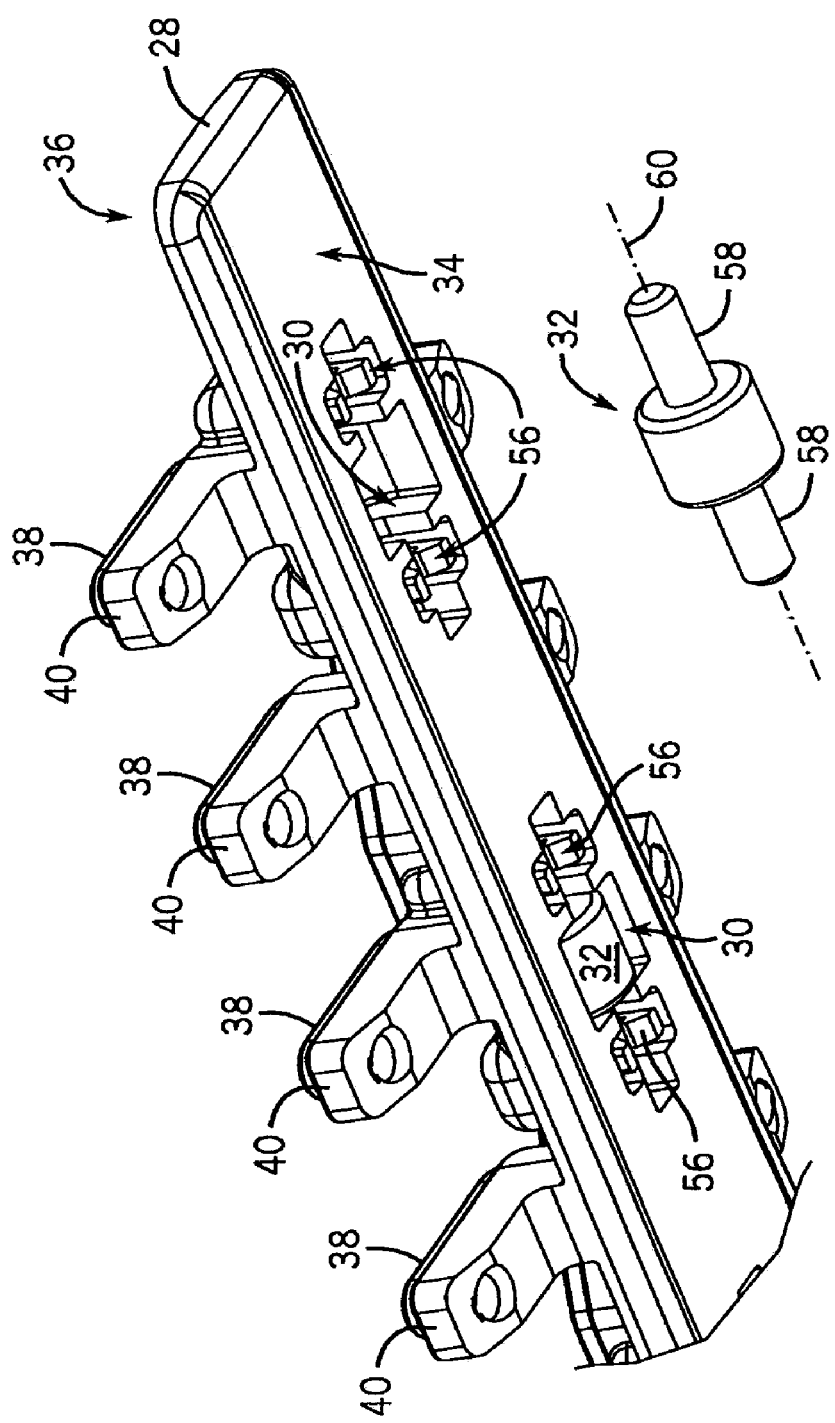
FIG. 7 is a partial bottom perspective view of the support plate of FIG. 6 showing engaged and disengaged roller bearings.

Referring now to the embodiment shown in FIGS. 6 and 7, the support plate 28 includes an alternative system for securing the rollers 32 within the cavities 30. Specifically, as best shown in FIG. 7, the support plate 28 may include a pair of locking clips 56 integrally formed within each cavity 30. Accordingly, these clips or snap fittings 56 are configured to engage a set of pins 58 integrally formed with the roller 32 and extending therefrom on either side. In this regard, the roller 32 can be aligned with the cavity 30 and depressed into the passage whereby the pins 58 slide into the snap fitting 56 and to be engaged therewith. Once the roller is positioned within the cavity 30, the snap fittings 56 permit the roller to rotate about an axis 60 extending along the pins 58 while retaining the rollers 32 within the cavity 30.

Figure 8:
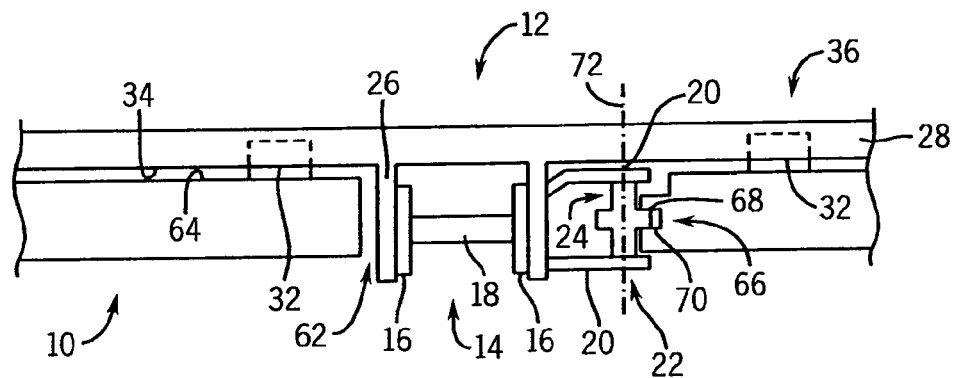
FIG. 8 is a cross-sectional view of the assembled support plate of FIG. 4 along lines 8-8, shown engaged with guide surfaces of the spiral path of FIG. 1.

Referring now to FIG. 8, a cross-sectional view taken along lines 8-8 of FIG. 4 is shown with the support plate 28 and base chain 14 (e.g., roller chain) engaged with the spiral path 10 of FIG. 1. As shown, the spiral path 10 includes a recess 62 within which the base chain 14 and associated components are disposed. Accordingly, the spiral path 10 includes a first guide surface 64 that is engaged by the rollers 32 and a second guide surface 66 engaged by the roller bearing 24 supported by the pair of arms 20 extending from the sidebar 16 of the base chain 14. As the helical conveyor system 12 traverses over the spiral path 10, the support plate 28 is supported on the rollers 32 against the first, horizontally-oriented, guide surface 64. In this regard, the majority of the weight of objects positioned on the helical conveyor system 12 is supported by the rollers 32 through the support plates 28. Accordingly, loading forces associated with the objects positioned on the upper transport surface 36 and frictional forces associated with traversing the spiral path 10 are significantly reduced by the rollers 32 rolling over the first guide surface 64 of the spiral path 10.

To further reduce torsional and frictional forces associated with traversing the spiral path 10, the bearing roller 24 is configured to roll along the second, vertically-oriented, guide surface 66 of the spiral path 10. Additionally, in an effort to resist vertical and horizontal forces that would promote disengaging the helical conveyor system 12 from the spiral path 10, the bearing roller 24 may have a contoured surface such as a lip 68 formed thereon and configured to be received by a reciprocally contoured surface 70 formed in the second bearing surface 66. Though a rotational axis 72 of the bearing roller 24 is shown as being substantially vertical, it is contemplated that the rotational axis 72 may be angled to further facilitate engagement with the reciprocally contoured second guide surface 66. For example, if the bearing roller 24 includes a less dramatic contour than the lip 68 shown in FIG. 8, such as an acutely angled depression, it may be desirable to adjust the axis of rotation from the vertical position shown in FIG. 8 to more securely engage the bearing roller 24 with the second guide surface 66.

Accordingly, through the rollers 32 formed in the support plates 28 as well as the contoured roller bearing 24 extending from the base chain 14, torsional, loading, and frictional forces are significantly reduced, thereby, reducing the amount of power required to traverse the helical conveyor system 12 over the spiral path 10. Likewise, wear and susceptibility to debris positioned on the spiral path 10 is significantly reduced. Accordingly, maintenance and upkeep costs associated with operating the helical conveyor system 12 are also reduced.

It is also contemplated that the cavities 30 and roller 32 configurations may be utilized with a modular belt. For example, referring now to FIGS. 9 and 10, a modular link belt 74 designed to follow a straight path is shown that incorporates the roller system of the present invention. Of course, the modular belt can be designed to follow a curved path without departing from the scope of the invention. In particular, the modular belt 74 also includes a plurality of support plates 28, or belt modules. However, rather than being joined through a base chain, the support plates 28 include link ends 76 along the leading edge 35 configured to engage reciprocally arranged link ends 76 disposed along the trailing edge 37 of an adjacent support plate 28. A pin 78 is then passed through coaxially aligned passages formed through the link ends 76 to secure together adjacent support plates 28.

Figure 10:
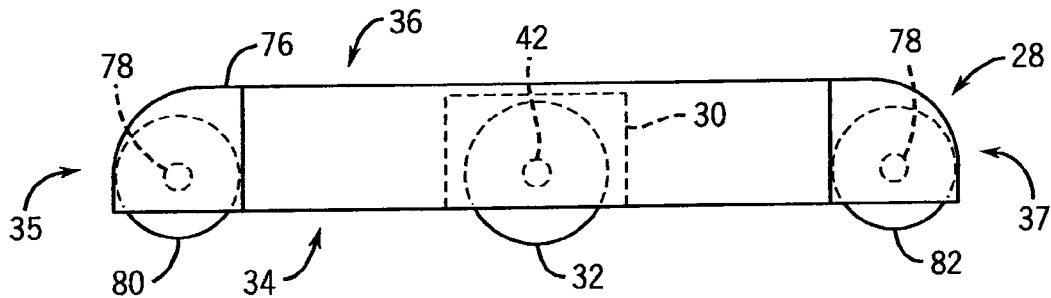
FIG. 10 is a side elevational view of the modular link conveyor system of FIG. 9.
Figure 9:
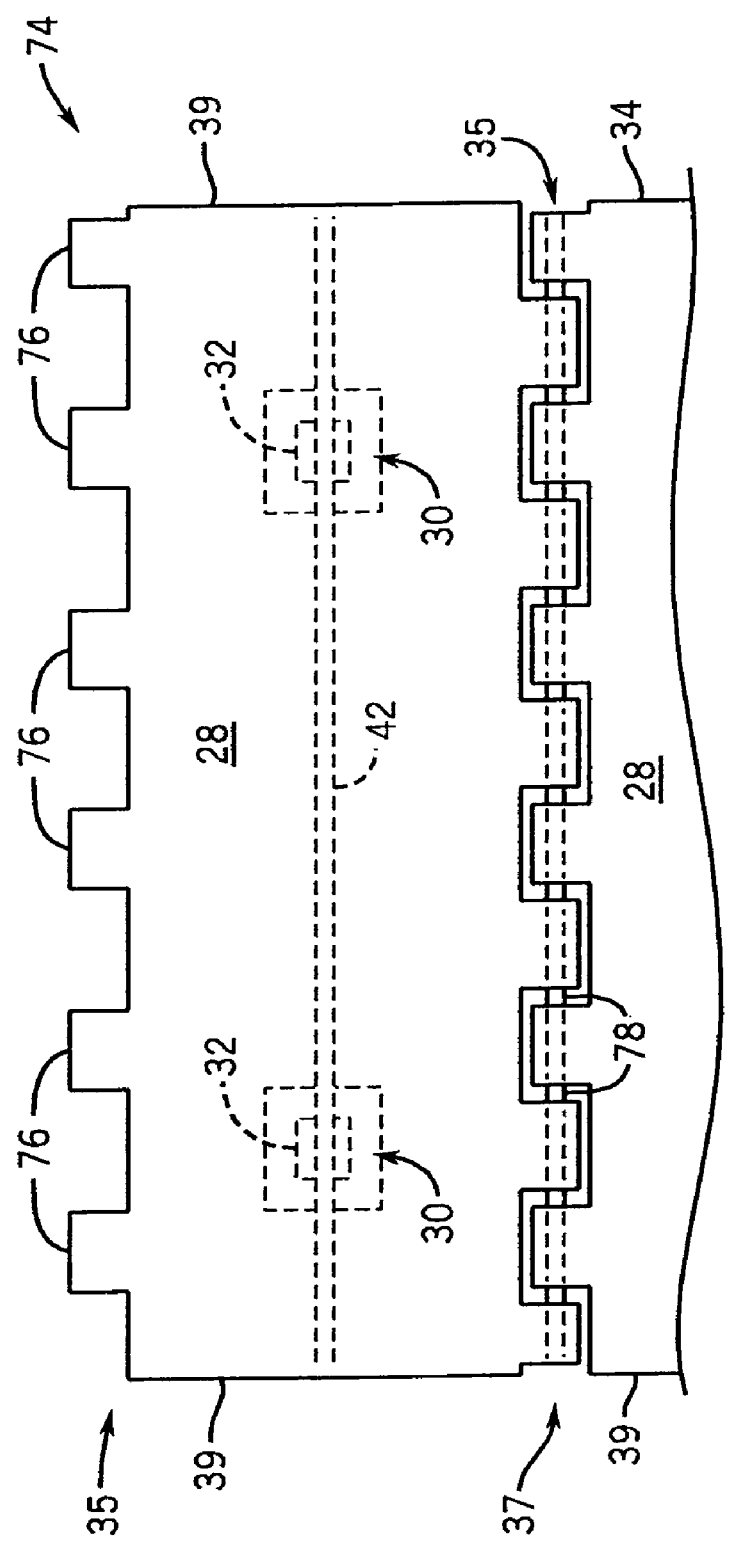
FIG. 9 is a plan view of a modular link conveyor system in accordance with the present invention.

Again, as described above, the support plates 28 include the lower surface 34 and the upper transport surface 36 joined by the leading edge 35, trailing edge 37, and pair of side walls 39. In this regard, the plurality of downwardly opening passages or cavities 30 are again formed within the lower surface 34 of each support plate 28 to house a roller 32. As shown in FIGS. 9 and 10, the pin 42 may be used to secure the rollers 32 within each cavity 30. However, as described with respect to FIGS. 6 and 7, clips or other similar retaining systems may be utilized instead of the pin 42.

As shown in FIG. 10, it is contemplated that additional rollers 80, 82 may be disposed within the links 76 arranged along the leading edge 35 and the trailing edge 37, respectively. Accordingly, three separate sets of rollers 32, 80, 82 can be formed on each support plate 28. However, as shown, none of the rollers 32, 80, 82 extend through the upper transport surface 36.

Therefore, a conveyor system is created that significantly reduces torsional, loading, and frictional forces experienced as the conveyor belt traverses a given path. As such, the amount of power required to operate the conveyor system is reduced. Similarly, wear and susceptibility to debris positioned encountered during operation of the conveyor system is significantly reduced. Accordingly, maintenance and upkeep costs associated with operating the conveyor system are also reduced.

While there have been shown and described what is at present considered the preferred embodiments of the invention, it will be obvious to those skilled in the art that various changes and modifications can be made therein without departing from the scope of the invention defined by the appended claims.

We claim
1. A conveyor system comprising:
a travel path having a guide surface; and
at least one conveyor support plate, comprising:
an upper transport surface;
a lower surface arranged opposite the upper transport surface;
at least one wall connecting the upper transport surface and the lower surface;
at least one cavity formed in the lower surface and terminating prior to the upper transport surface; and
at least one roller engaged within the at least one cavity and extending through the lower surface to support the conveyor support plate during travel of the conveyor support plate;
wherein the at least one roller rotatably engages the guide surface and supports the at least one conveyor support plate above the guide surface as the at least one conveyor support plate traverses the travel path.

2. The conveyor system of claim 1 further comprising a snap fitting disposed within the at least one cavity configured to rotatably secure the at least one roller in the at least one cavity.

3. The conveyor system of claim 1 further comprising a transverse passage extending coaxially through the at least one cavity and a pin extending through the transverse passage and an opening formed in the at least one roller to secure the at least one roller in the at least one cavity.

4. The conveyor system of claim 1 wherein the upper transport surface is configured to support objects positioned on the at least one conveyer support plate.

5. The conveyor system of claim 1 wherein a plurality of the at least one conveyor support plates form an endless conveyor belt.

6. The conveyor system of claim 1 further comprising:
a base chain extending along the travel path and engaged with the at least one conveyor support plate near a center of the lower surface; and
wherein the at least one cavity includes two cavities that are arranged on opposing sides of the base chain.

7. The conveyor system of claim 6 further comprising:
at least one pair of arms extending from the base chain;
at least one bearing roller supported by each pair of arms to engage a vertically oriented and contoured guide surface of the travel path; and
wherein the at least one bearing roller is configured to restrain the at least one conveyor support plate from disengaging the travel path through an interface of the at least one bearing roller with the contoured guide surface.

8. A conveyor support plate comprising:
an upper transport surface;
a lower surface arranged opposite the upper transport surface;

at least one wall connecting the upper transport surface and the lower surface;

at least one cavity formed in the lower surface and terminating prior to the upper transport surface; and at least one roller engaged within the at least one cavity and extending through the lower surface to support the conveyor support plate during travel of the conveyor support plate.

9. The conveyor support plate of claim 8 further comprising an axle passage extending between the upper transport surface and the lower surface, and through the at least one cavity to receive an axle extending through the at least one cavity and a coaxially aligned passage formed in the at least one roller to rotatably secure the at least one roller in the at least one cavity.

10. The conveyor support plate of claim 8 further comprising a snap fitting disposed within the at least one cavity to rotatably secure the at least one roller therein.

11. The conveyor support plate of claim 8 further comprising an interface arranged on the lower surface configured to engage a base chain joining adjacent conveyor support plates in a helical conveyor system.

12. The conveyor support plate of claim 8 further comprising a plurality of links extending from the at least one wall to engage a reciprocally arranged plurality of links extending from an adjacent conveyor support plate.

13. The conveyor support plate of claim 12 further comprising a pin configured to extend through passages formed in each of the plurality of links to secure together the adjacent conveyor support plates to form a modular belt conveyor.

* * * * *

UNITED STATES PATENT AND TRADEMARK OFFICE
CERTIFICATE OF CORRECTION

PATENT NO.       : 7,854,315 B2
APPLICATION NO.  : 12/478489
DATED            : December 21, 2010
INVENTOR(S)      : James C. Stebnicki et al.

It is certified that error appears in the above-identified patent and that said Letters Patent is hereby corrected as shown below:

Page 1, (73) Assignee: "Roxnord Industries, LLC" should be changed to
-- Rexnord Industries, LLC --

Signed and Sealed this
Twenty-second Day of February, 2011

David J. Kappos
*Director of the United States Patent and Trademark Office*